United States Patent
MacArthur et al.

(10) Patent No.: US 10,336,551 B1
(45) Date of Patent: Jul. 2, 2019

(54) OVER-TRAVEL LIMITING SYSTEM AND METHOD OF USE THEREOF

(71) Applicant: HONDA MOTOR CO., LTD., Minato-ku, Tokyo (JP)

(72) Inventors: Benjamin B. MacArthur, Barrie (CA); John Osborne, South Alliston (CA)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/934,561

(22) Filed: Mar. 23, 2018

(51) Int. Cl.
| | |
|---|---|
| B65G 43/02 | (2006.01) |
| B65G 17/20 | (2006.01) |
| H01H 36/00 | (2006.01) |
| B62D 65/18 | (2006.01) |
| B62D 65/02 | (2006.01) |

(52) U.S. Cl.
CPC .......... *B65G 43/02* (2013.01); *B62D 65/022* (2013.01); *B62D 65/18* (2013.01); *B65G 17/20* (2013.01); *H01H 36/0046* (2013.01)

(58) Field of Classification Search
CPC ........ B65G 43/02; B65G 43/08; B65G 17/20; B61B 12/06
USPC .......... 198/678.1, 687, 465.4, 345.2; 104/89, 104/91, 178, 179
See application file for complete search history.

(56) References Cited

U.S. PATENT DOCUMENTS

| | | | |
|---|---|---|---|
| 4,002,231 A * | 1/1976 | Doty | B65G 43/00 198/367 |
| 4,540,083 A | 9/1985 | Cowdery et al. | |
| 4,915,207 A | 4/1990 | Henning | |
| 5,318,167 A | 6/1994 | Bronson et al. | |
| 5,906,262 A | 5/1999 | Miki | |
| 6,087,623 A | 7/2000 | Kwon et al. | |
| 6,173,813 B1 * | 1/2001 | Rebillard | B66B 5/06 187/287 |
| 7,137,769 B2 * | 11/2006 | Komatsu | B65G 35/06 414/222.01 |
| 7,484,616 B2 * | 2/2009 | Nakamura | B61B 10/02 104/172.2 |
| 7,497,321 B2 * | 3/2009 | Matsubara | B65G 49/0459 198/465.4 |
| 7,650,969 B2 | 1/2010 | Monzon et al. | |
| 9,321,611 B2 * | 4/2016 | Wei | B66B 5/24 |
| 9,505,588 B2 * | 11/2016 | Guillot | B66B 7/027 |
| 2007/0068773 A1 * | 3/2007 | Santicchi | B65G 47/61 198/465.4 |
| 2012/0297681 A1 * | 11/2012 | Krupke | E05F 15/60 49/324 |
| 2016/0297617 A1 * | 10/2016 | Kempf | B65G 43/00 |

* cited by examiner

*Primary Examiner* — James R Bidwell
(74) *Attorney, Agent, or Firm* — Arent Fox LLP

(57) ABSTRACT

Aspects of the present disclosure include an over-travel limiting system having an coupling assembly configured to couple to an overhead rail, a track assembly including a track engagement feature, wherein the track assembly is disposed at an angle with respect to the coupling assembly, an arm assembly having an arm and a track guide portion mateably engageable with the track engagement feature of the track assembly, the arm assembly being configured to move along the track engagement feature between a first position and a second position, and one or more proximity sensors coupled to at least one of the track assembly and the arm assembly and configured to detect movement of the arm assembly with respect to the track assembly.

20 Claims, 10 Drawing Sheets

OVER-TRAVEL LIMITING SYSTEM AND METHOD OF USE THEREOF

BACKGROUND

A vehicle assembly line may utilize a variety of manufacturing devices for assembling the vehicles. The manufacturing devices may perform tasks such as welding, installations, polishing, painting, etc. During certain tasks, a manufacturing device may be temporarily attached to a vehicle, intentionally or unintentionally, on the assembly line. If the vehicle begins moving along the assembly line while the manufacturing device is attached, the movement may drag the manufacturing device beyond an intended zone of use of the manufacturing device (i.e., into an over-travel condition), potentially damaging the manufacturing device. Therefore, it may be desirable to prevent any unintended movement of the manufacturing device.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include an over-travel limiting system having an coupling assembly configured to couple to an overhead rail, a track assembly including a track engagement feature, wherein the track assembly is disposed at an angle with respect to the coupling assembly, an arm assembly having an arm and a track guide portion mateably engageable with the track engagement feature of the track assembly, the arm assembly being configured to move along the track engagement feature between a first position and a second position relative to the track assembly under an application of an external force, and one or more proximity sensors coupled to at least one of the track assembly and the arm assembly and configured to detect movement of the arm assembly with respect to the track assembly.

Aspects of the present disclosure also include an assembly line for manufacturing vehicles having a manufacturing device, a conveyor for moving the vehicles, a controller configured to control an operation of the conveyor including an operation of the manufacturing device, an overhead rail disposed along the assembly line, and an over-travel system configured to detect an unintended movement of the manufacturing device, the over-travel limiting system including: a coupling assembly configured to couple to the overhead rail, a track assembly including a track, wherein the track assembly is disposed at an angle with respect to the coupling assembly, an arm assembly having an arm and a track guide mateably engageable with the track of the track assembly, the arm assembly being configured to move along the track between a first position and a second position relative to the track assembly, and one or more proximity sensors coupled to at least one of the track assembly and the arm assembly and configured to detect a movement of the arm assembly with respect to the track assembly.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

Various novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, ATVs, boats, personal watercraft, and aircraft. In some cases, a motor vehicle includes one or more engines.

Aspects of the present disclosure may include an over-travel system. The over-travel system may detect an unintended movement of a manufacturing device in an assembly line. When the system detects the unintended movement caused by the manufacturing device, which may, for example, apply a force on the system, a signal may be sent to the controller of the assembly line to suspend an operation of a conveyor of the assembly line. However, from the detection of the unintended movement to the conveyor coming to a full stop, it may be possible for the manufacturing device to traverse an over-travel distance. The over-travel distance of the manufacturing device may be caused by a delay in suspending the operation of the conveyor, momentum of the manufacturing device, momentum of vehicles, and/or other factors that may prevent the manufacturing device from coming to an immediate stop upon the detection of the unintended movement. The over-travel system may be configured to accommodate the over-travel distance of the manufacturing device. Further, once the manufacturing device ceases to apply the force on the over-travel system, the over-travel system may be restored to its initial state (e.g., preparing to detect another unintended movement).

Figure 1:
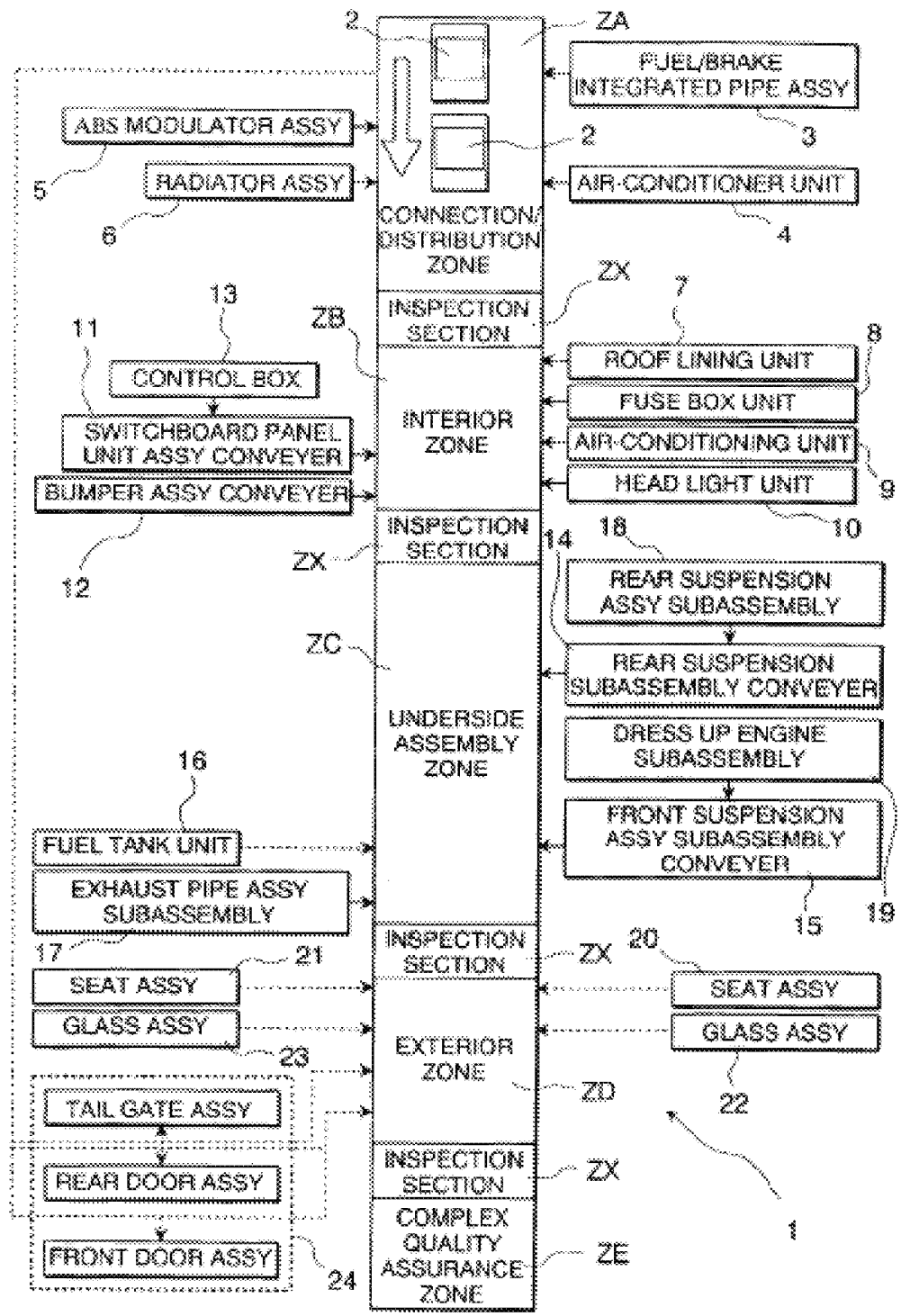
FIG. 1 illustrates a schematic view of an example of an operating environment of an over-travel system, usable in accordance with aspects of the present disclosure.

FIG. 1 is a representative diagram showing various components of an example vehicle assembly line usable in conjunction with various aspects of the present disclosure. In FIG. 1, reference numeral 1 denotes a main line, which may be used, for example, in assembling various parts for a plurality of types of vehicle bodies 2 supplied after being coated in the coating process.

This main line 1 may further include a connection/distribution zone ZA, an interior zone ZB, an underside assembly zone ZC, an exterior zone ZD, and a complex quality assurance zone ZE. The vehicle body 2, subsequent to various stages of being assembled in the main line 1, may be transferred to a further process, such as inspection. The main line 1 shown in FIG. 1 therefore may correspond to the main process of assembly.

Various supply lines or sub-lines may be connected to or otherwise be associated with the main line 1 along zones ZA-ZE (e.g., as a fuel/brake unified pipe assembly sub-line 3 associated with zone ZA) The above-described sub-lines may be operated so as to move synchronously with the main line 1. The above-described zones may be classified by the functions of the assembly operations, and one advantage of the functional classification of the operations may be to make it possible to prevent unnecessary disassembly and reassembly operations by executing quality assurance at each inspection section ZX that is provided after each assembly zone from ZA to ZD. For example, both ends of a trunk grid switch cable may be fixedly connected in the connection/distribution zone ZA. However, since the proper assembly and/or operation of a trunk grid switch cable may only be confirmed by inspecting the working function of the cable in the inspection section ZX after the assembly process in the connection/distribution zone ZA, it may be possible to eliminate a disassembly processes of the assembled body formed in the zone ZA in the following zone for fixing errors if such inspection is carried out immediately upon completion of the zone ZA assembly process.

Figure 2:
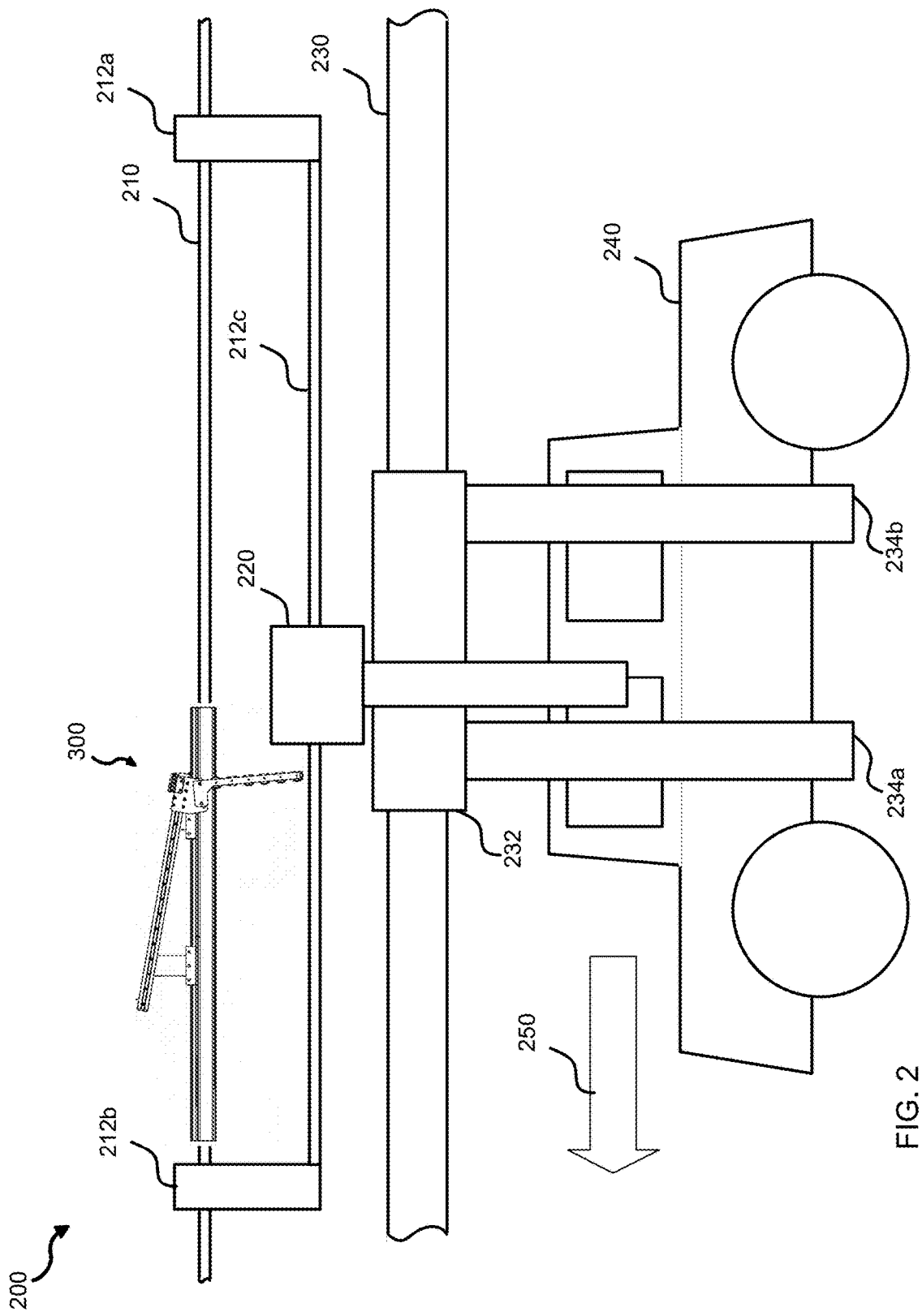
FIG. 2 illustrates an example of an assembly line equipped with an over-travel system, in accordance with aspects of the present disclosure.

FIG. 2 illustrates various representative features and components for an example assembly line 200 equipped with an over-travel system 300 in accordance with aspects of the present disclosure. As shown in FIG. 2, the assembly line 200 may include an overhead rail 210 that extends in a direction along a direction of movement 250 of the assembly line 200, for example. The assembly line 200 may also include a secondary rail 212c attached to the overhead rail 210 using mounting brackets 212a, 212b, for example. The over-travel system 300 may be fixedly coupled to the overhead rail 210 along the assembly line 200. In certain examples, the overhead rail 210 and the secondary rail 212c may be or include stationary railings that provide physical support to any equipment that may be used for the assembly line 200, such as the over-travel system 300. In other examples, workers may hang equipment or tools on the overhead rail 210 or the secondary rail 212c. The overhead rail 210 and the secondary rail 212c may be stationary.

In certain implementations, the assembly line 200 may further include a manufacturing device 220 and a conveyor 230. The manufacturing device 220 may include, for example, one or more of a robot, a lift assist, an automatic guided vehicle, cranes, arms, or other suitable devices. The manufacturing device 220 may be suspended on the secondary rail 212c, and may move along the secondary rail 212c, for example.

The conveyor 230 may include, for example, a single-lane, in-floor slat conveyor, a dual-lane in-floor slat conveyor, a towline conveyor, an overhead conveyor, and/or a chain conveyor. For example, the conveyor 230 may include an overhead conveyor having a chain running beneath a continuous, stationary, flanged rail, which may be different from the overhead rail 210. A number of carriers may be suspended along such overhead conveyor. Each carrier may move a vehicle or a part/component of a vehicle along the rail. Each carrier may optionally include a support trolley. The carriers may be custom designed to transport different manufacturing products. The chain may pull the carriers along the overhead conveyor. Alternatively, the conveyor 230 may include a towline conveyor that uses a towline to move the vehicles on the conveyor 230, for example, along a track. The conveyor 230 may also include a slat conveyor using one or more closed loop chains with slats attached. Additionally, the conveyor 230 may also include a chain conveyor utilizing a powered continuous chain arrangement. The manufacturing device 220 may assist workers in the manufacturing of a vehicle 240, for example. The conveyor 230 may move the vehicle 240 in direction 250.

Figure 9:
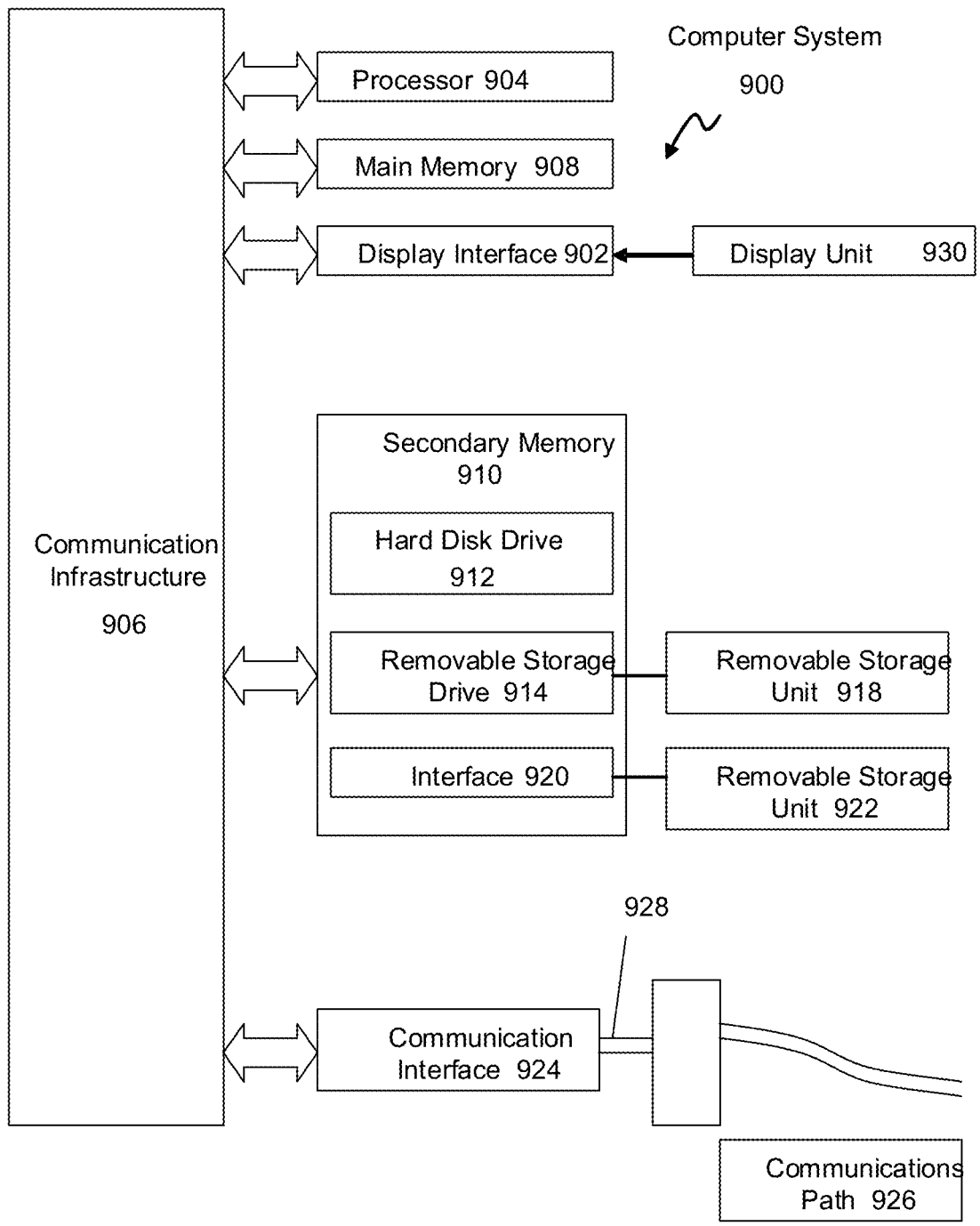
FIG. 9 is an example computer that may be used as a controller for the assembly line in the present disclosure.

In one example, the conveyor 230 may be an overhead conveyor type. The conveyor 230 may include a vehicle carrier 232 for transporting the vehicle 240 along the conveyor 230. The vehicle carrier 232 may include supporting arms 234a, 234b that suspend the vehicle 240 along the conveyor 230. The vehicle 240 may not be in contact with the floor of the assembly line when suspended by the supporting arms 234a, 234b of the vehicle carrier 232. During the transport of the vehicle 240 along the conveyor 230, the vehicle carrier 232 may move the vehicle 240 in the direction of movement 250. The assembly line 200 may include other manufacturing devices (not shown in FIG. 2) and a controller (not shown in FIG. 2) for controlling the operations of the assembly line 200 and the manufacturing device 220. An example of the controller is shown in FIG. 9 below.

In some implementations, the conveyor 230 may move the vehicle 240 to a position so as to be accessible by the manufacturing device 220. The manufacturing device 220 may perform tasks such as welding, installations, polishing, or painting, for example. The manufacturing device 220 may be temporarily attached to or otherwise engaged with the vehicle 240 while the manufacturing device 220 is performing one or more of the tasks. In certain circumstances, the conveyor 230 may begin moving the vehicle 240 prior to the manufacturing device 220 completing a task. The premature movement of the conveyor 230 may cause the vehicle 240, and the temporarily engaged manufacturing device 220, to unintendedly move contemporaneously. This unintentional movement may cause the manufacturing device 220, for example, to apply a force against or relative to the over-travel system 300. Upon detecting the application of such force, the over-travel system 300 may send a notification to the controller to suspend the operations of the conveyor 230 and/or the manufacturing device 220, as discussed in further detail below.

Figure 3:
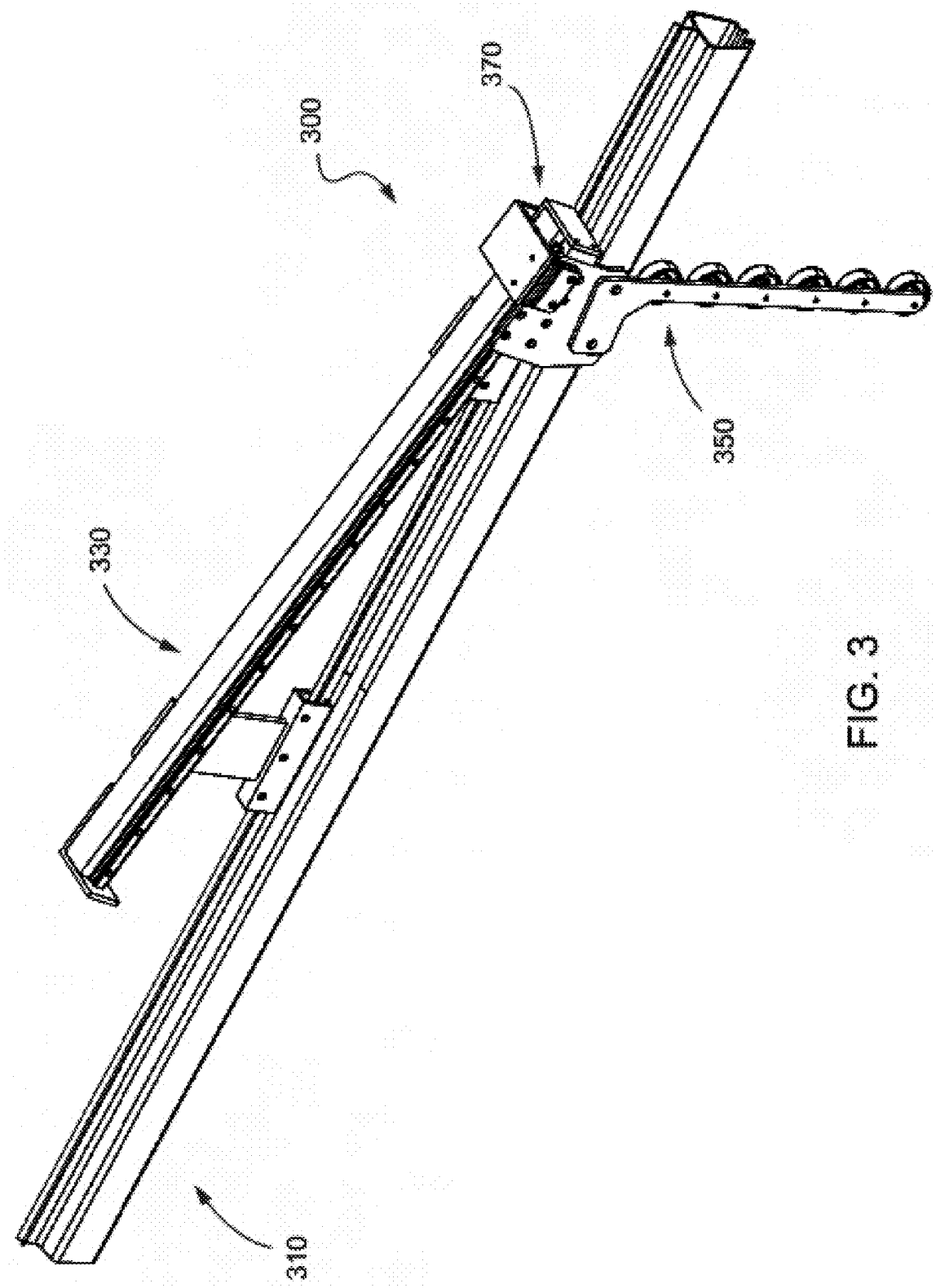
FIG. 3 illustrates a perspective view of the over-travel system shown in FIG. 2.

Referring to FIG. 3, in some implementations, the over-travel system 300 may include a coupling assembly 310 for fixedly coupling to, for example, the overhead rail 210 (FIG.

2) located along the assembly line 200 (FIG. 2). In certain implementations, the coupling assembly 310 may be configured to clamp around the overhead rail 210 (FIG. 2), described in more detail in FIG. 5 and corresponding descriptions below. For example, the coupling assembly 310 may be designed, based on the shape of the overhead rail 210, to be fixedly or semi-permanently coupled to the overhead rail 210. In the example implementation shown in FIGS. 2 and 3, the overhead rail 210 may be or include a bar having a substantially rectangular cross section. The coupling assembly 310 may have a substantially rectangular cross section configured to mateably couple to the overhead rail 210. In other implementations, the coupling assembly 310 may be redesigned (different width, length, height, shape, for example) to be fixedly coupled to other support railings. For example, if the overhead rail 210 includes a flat surface having screw holes, the coupling assembly 310 may include a corresponding flat surface having matching screw holes. A worker may thereby install the coupling assembly 310 on the overhead rail 210 by screwing the flat surfaces together using screws or other fasteners so the coupling assembly 310 is fixed coupled to the overhead rail 210. In another example, the overhead rail 210 may include metallic materials, and the coupling assembly 310 may include magnets to couple to the metallic materials of the overhead rail 210. In certain implementations, the coupling assembly 310 may function as an adaptor to fixedly couple the over-travel system 300 to a supporting structure.

The over-travel system 300 may further include a track assembly 330. The track assembly 330 may be disposed at an angle with respect to coupling assembly 310. For example, the angle between the coupling assembly 310 and the track assembly 330 may be about 5 degrees, 10 degrees, 15 degrees, 25 degrees, 35 degrees, or 45 degrees. The over-travel system 330 may also include an arm assembly 350. The arm assembly 350 may be configured to slide along the track assembly 330 when an external force is applied to the arm assembly 350. The external force may be caused, for example, by the unintentional movement of the manufacturing device 220 of FIG. 2. For example, as shown in FIG. 2, if the manufacturing device 220 is interoperating with the vehicle 240 in the assembly process while the vehicle 240 moves on the conveyor 230 of the assembly line 200, the manufacturing device 220 may unintendedly move and operably engage the arm assembly 350 (FIG. 3) of the over-travel system 300 (FIG. 3) in the direction of movement of the manufacturing device 220. The over-travel system 300 may include one or more one or more proximity sensors 370 configured to detect the movement of the arm assembly 350, as further shown and discussed in conjunction with FIG. 4 below.

Referring to FIGS. 2 and 3, in a non-limiting example, if the manufacturing device 220 unintendedly moves in the direction of movement 250 and operably engages the arm assembly 350, the coupling assembly 310 and the track assembly 330 may remain fixed with respect to the attached overhead rail 210, while the arm assembly 350 may be caused to move along the track assembly 330 due to the force applied by the manufacturing device 220. The one or more proximity sensors 370 may detect the movement of the arm assembly 350, and thus detect the unintended movement of the manufacturing device 220.

Figure 4:
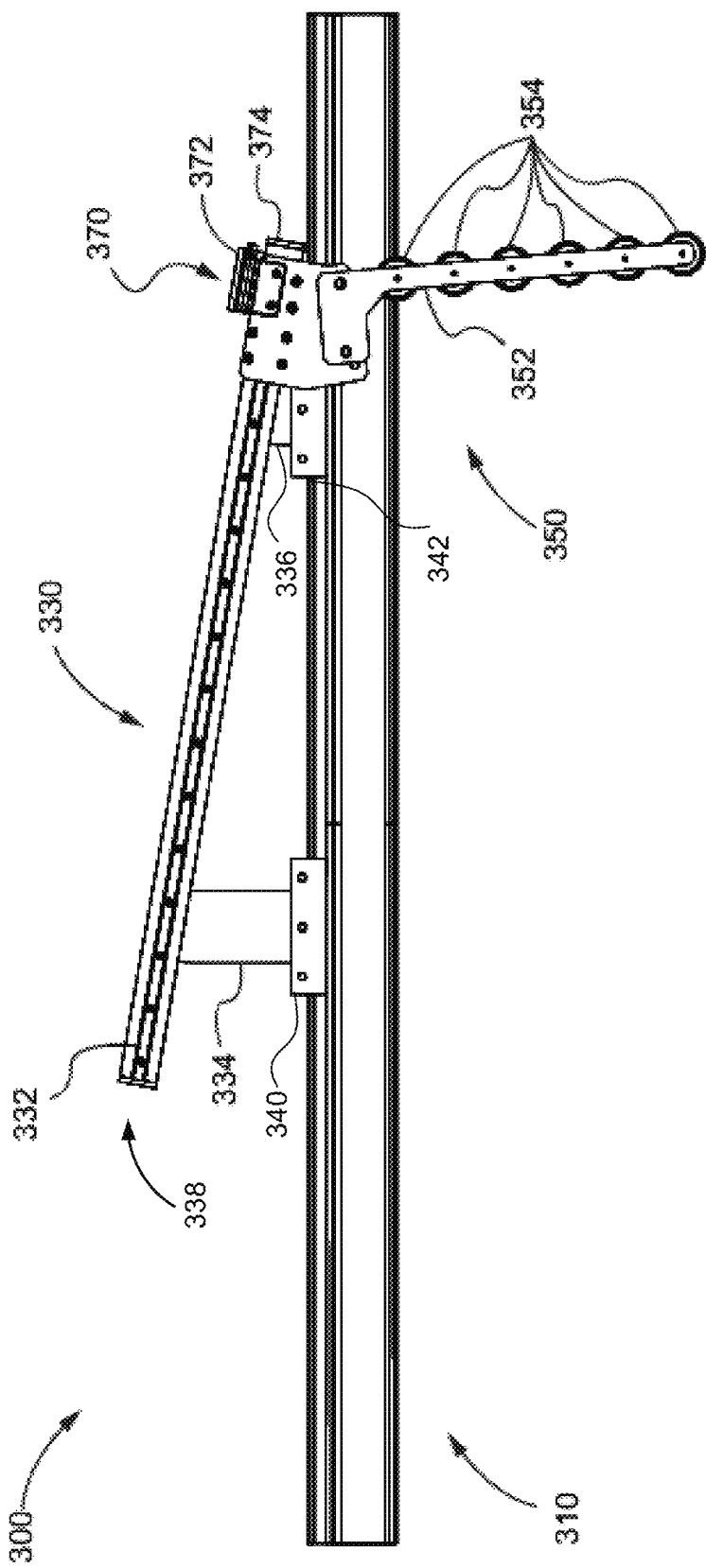
FIG. 4 illustrates a side view of the over-travel system shown in FIG. 2.
Figure 6:
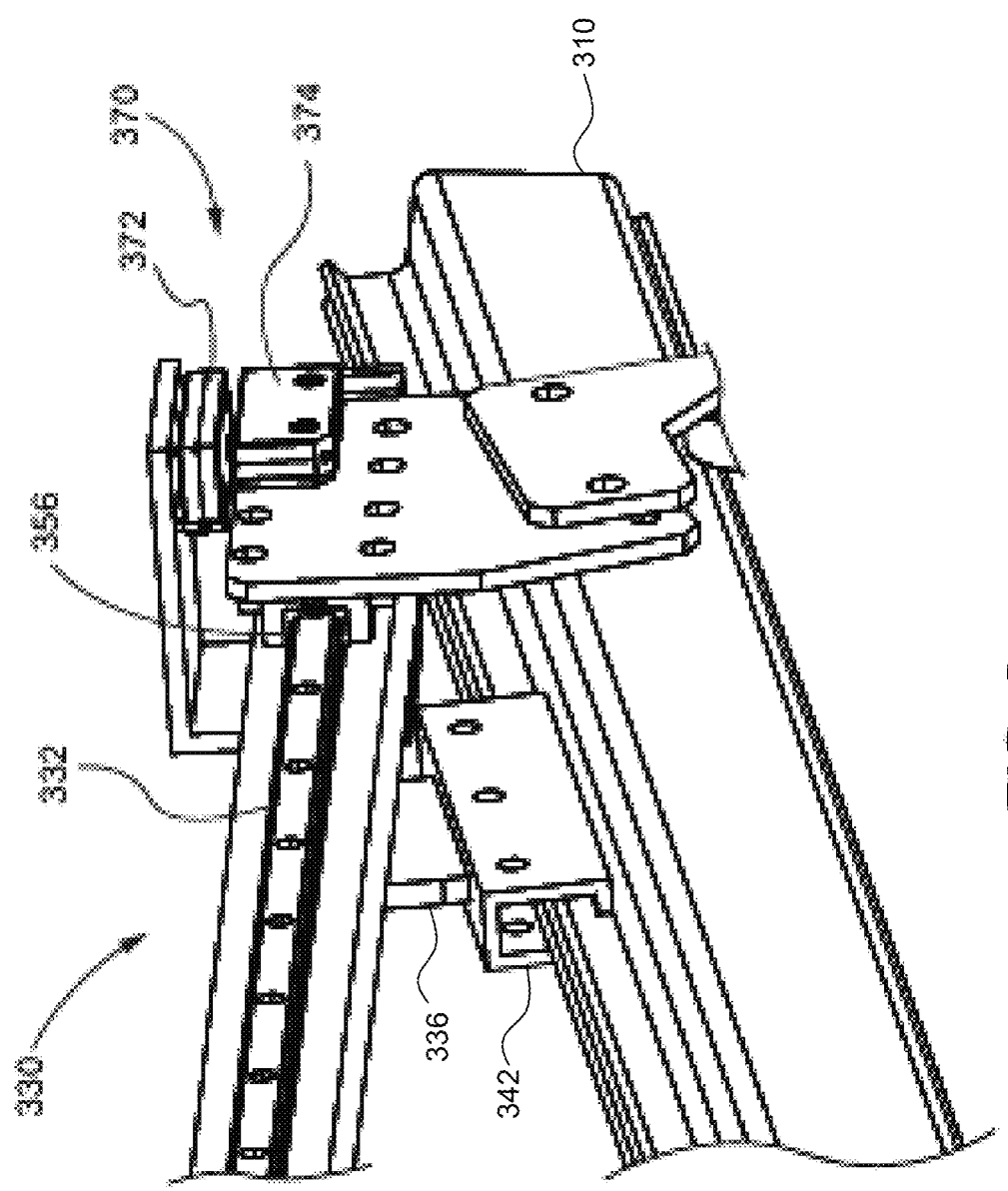
FIG. 6 illustrates a zoom-in view of the over-travel system shown in FIG. 2.

Referring now to FIG. 4, shown is a side view of the over-travel system 300 of FIG. 3. The track assembly 330 may include a track 332 (as further discussed below), a first support member 334, and a second support member 336, each of which is attached to the track 332. The first support member 334 and the second support member 336 may also attach the track assembly 330 to the coupling assembly 310 (e.g., via a coupling component 340, 342). The arm assembly 350 may include an arm portion 352, one or more wheels 354, and a track guide 356 (FIG. 6). The track 332 may be mateably engageable with the track guide 356 (FIG. 6) to enable the arm assembly 350 to move along the track 332 of the track assembly 330 (as further discussed below).

In some implementations, the one or more wheels 354 of the arm assembly 350 may reduce a friction between the arm portion 352 and the manufacturing device 220 when the manufacturing device 220 operably engages the arm assembly 350 during the unintended movement detection process. The one or more wheels 354 may reduce the likelihood that the manufacturing device 220 may apply a vertical force on the over-travel system 300, the secondary rail 212c, and/or the overhead rail 210 (which could thereby damage one or more of these items during the detection process). The one or more wheels 354 may allow the arm assembly 350 to properly and smoothly interact with a contacting portion of the manufacturing device 220 during the unintended movement by the manufacturing device 220 when that device 220 is causing travel of the over-travel system 300 along the track assembly 330.

Still referring to FIG. 4, in some implementations, the one or more proximity sensors 370 may include at least a detector 372 and a marker 374. The detector 372 may be coupled to one end of the track assembly 330, and the marker 374 may be coupled to the arm assembly 350, for example. Alternatively, the marker 374 may be coupled to the one end of the track assembly 330 and the detector 372 may be coupled to the arm assembly 350. The one or more proximity sensors 370 may be or include a safety sensor. The operation of the conveyor 230 (FIG. 2) and/or the manufacturing device 220 (FIG. 2) may be enabled, for example, while the detector 372 is proximate to and thereby senses information from the marker 374. When the detector 372 fails to sense information from the marker 374, the detector 372 may send a signal to the controller, which may suspend the operations of the manufacturing device 220 and the conveyor 230 (FIG. 2). In some examples, the controller may suspend the operations of the manufacturing device 220 and the conveyor 230 (FIG. 2), for example, by removing the electrical power supplied to the manufacturing device 220 and the conveyor 230 (FIG. 2).

As the arm assembly 350 moves from one end of the track assembly 330 toward another end during assembly line operation, for example, the marker 374 may move away from or toward the detector 372. The arm assembly 350 may be configured to move under the application of the external force. The external force may originate from the unintended movement of the manufacturing device 220 (FIG. 2). During the unintended movement, the manufacturing device 220 may apply the external force onto the arm assembly 350, causing the arm assembly 350 to move from one end of the track assembly 330 toward another end. Once the marker 374 moves pass a threshold distance from the detector 372, the detector 372 may detect the movement of the arm assembly 350. The detection of the movement may indicate the presence of the unintended movement of the manufacturing device 220, and appropriate actions may be taken to ensure safety of workers and minimize damage to the manufacturing device 220 or other equipment. In response to the detection, the detector 372 may send a notification to the controller of the assembly line 200 indicating the movement of the arm assembly 350. For example, the one or more proximity sensors 370 may include a reed switch. The reed switch may include a magnet and a magnetic sensor. When the magnet moves away from the magnetic sensor, the sensor may detect a change the magnetic field. The reed switch may thereby be able to detect the arm assembly 350 sliding along the track assembly 330. Other types of sensors may also be utilized. Operations of the detector 372 is described in further detail in FIG. 7 and corresponding descriptions below.

Figure 5:
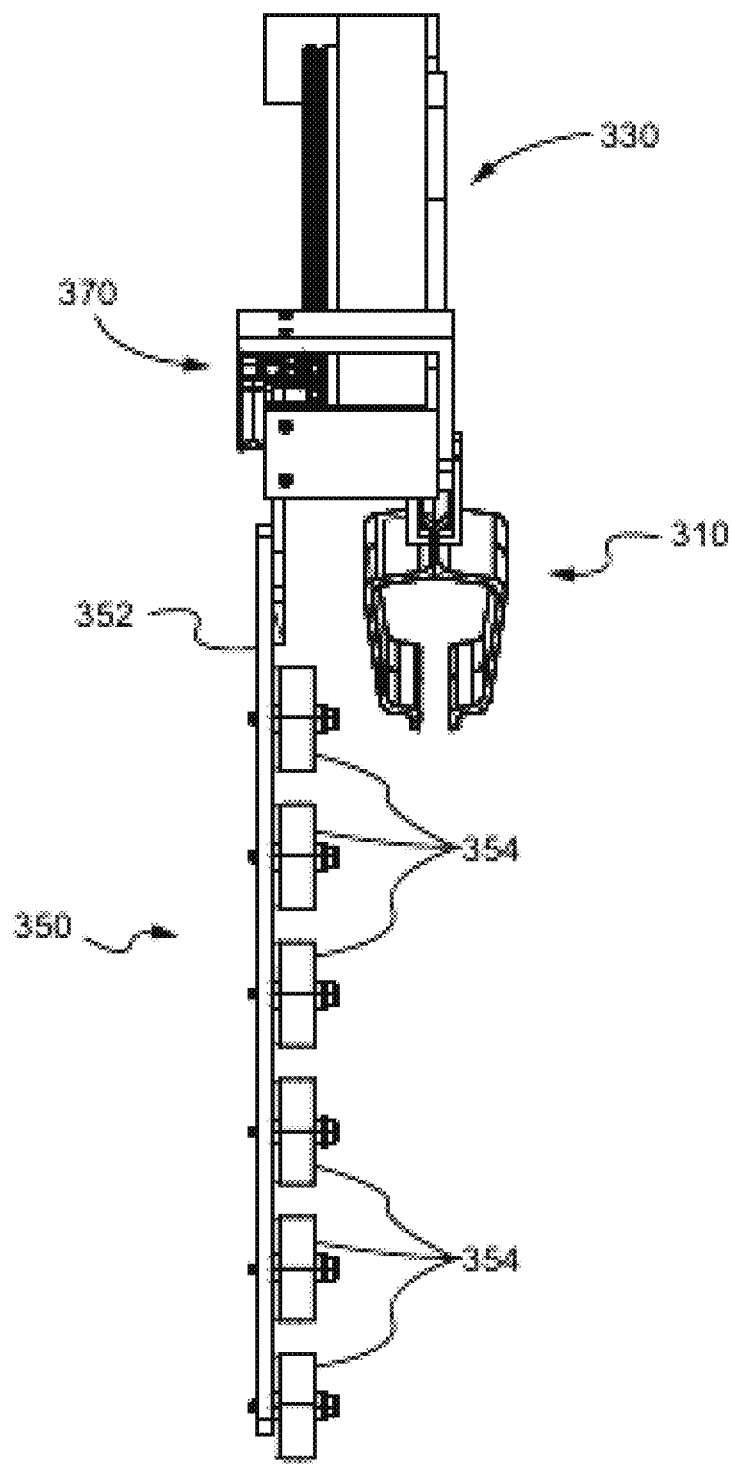
FIG. 5 illustrates a frontal view of the over-travel system shown in FIG. 2.

Referring now to FIG. 5, shown is a frontal perspective view of the over-travel system 300 of FIG. 3. The coupling assembly 310 may be configured to clamp around the overhead rail 210 of the assembly line 200, for example. The overhead rail 210 may be configured as a cable or beam along the assembly line 220 suitable for the coupling assembly 310 to clamp around a portion of the overhead rail 210. The coupling assembly 310 may be attached to the overhead rail 210 using other devices and/or features, such as fasteners, nails, screws, or clamps.

Referring now to FIG. 6, the track guide 356 may be proximal to the track 332 of the track assembly 330. The track guide 356 and the track 332 may cooperatively enable the arm assembly 350 (FIG. 4) to slide along the track assembly 330 upon the application of the external force. The track guide 356 may include wheels, ball bearings or any other suitable device and/or features that enable relatively unimpeded movement of the arm assembly 350 along the track 332 of the track assembly 330.

The first support member 334 (FIG. 4) and the second support member 336 may be configured to be attached to the track assembly 330 and to the coupling assembly 310 via the coupling components 340, 342. In some implementations, the first support member 334 (FIG. 4) and the second support member 336 may be attached, via the coupling components 340, 342 to a different coupling assembly than the coupling assembly 310, which may in turn be attached to a different overhead rail. For example, a worker on the assembly line 200 may detach the first support member 334 (FIG. 4) and the second support member 336 from the coupling assembly 310, and reattach to a different coupling assembly configured to be fixedly coupled to another support structure. This versatility allows the over-travel system 300 to be used in a wide variety of environments by simply replacing the coupling assembly 310.

Figure 7:
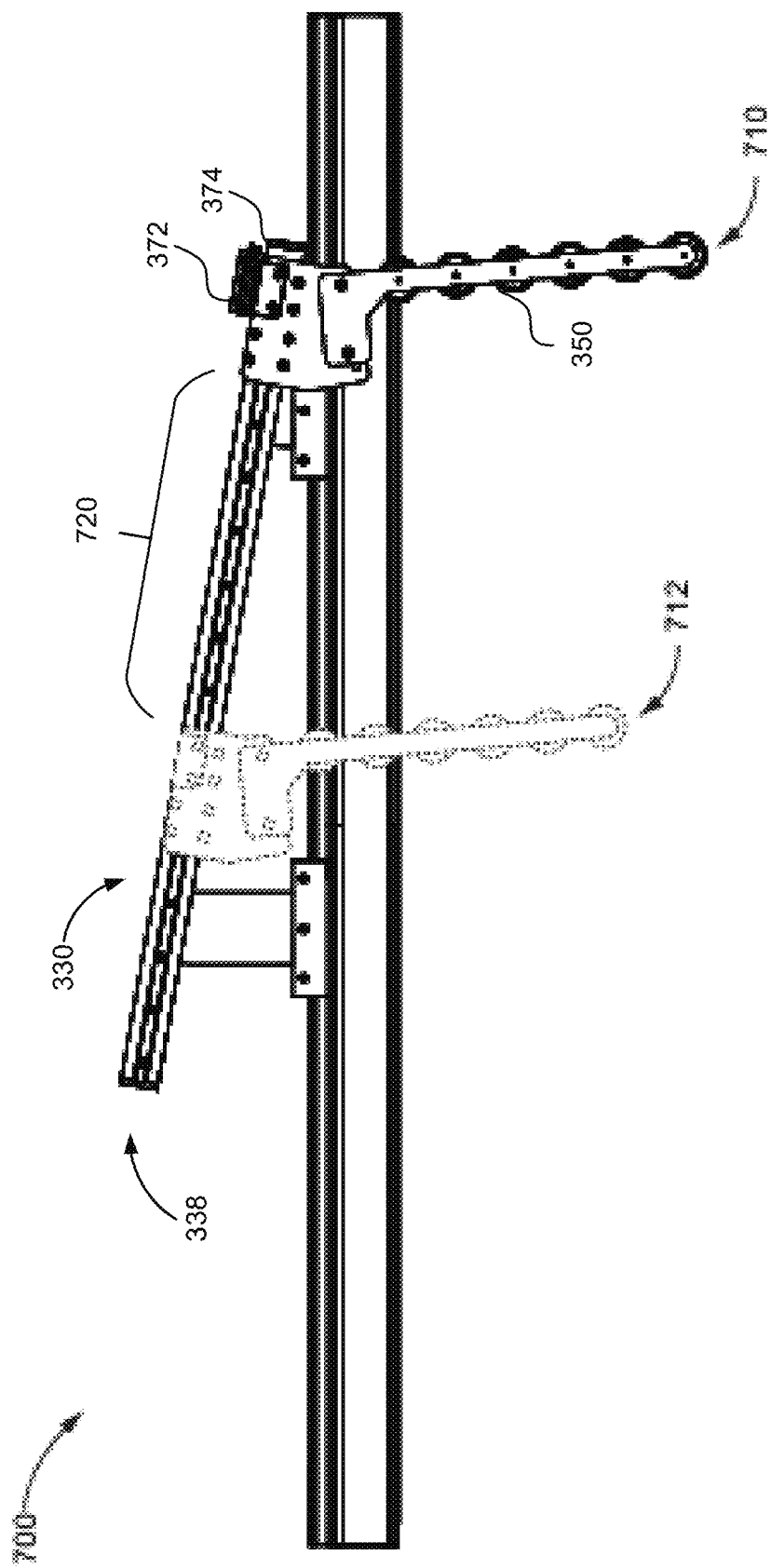
FIG. 7 illustrates an example of an operation of an example over-travel system, in accordance with aspects of the present disclosure.

FIG. 7 illustrates an example operation 700 of the over-travel system 300, in accordance with aspects of the present disclosure. As shown in FIG. 7, when an external force, such as the unintended movement of the manufacturing device 220 (FIG. 2), is applied to the arm assembly 350, the arm assembly 350 may move from a first position 710 toward a second position 712 while the coupling assembly 310 and the track assembly 330 remain unmoved. The movement of the arm assembly 350 may cause the marker 374 to move away from the detector 372. This separation may cause the detector 372 to send a notification signal to the controller of the assembly line 200 (FIG. 2), indicating the detection of an unintended movement. In response, the controller may suspend the operations of the conveyor 230 (FIG. 2) and the manufacturing device 220 (FIG. 2). After the suspension of the operations, the arm assembly 350 may continue to move away from the first position 710 toward the second position 712 as the manufacturing device 220 (FIG. 2) continues to apply the external force to the arm assembly 350. Consequently, the arm assembly 350 may move to or beyond the second position 712 when the manufacturing device 220 and or the conveyor 230 (FIG. 2) come to a full stop. The distance between the first position 710 and the second position 712 may correspond to the over-travel distance 720 of the manufacturing device 220 (FIG. 2). The over-travel distance 720 may depend on the weight of the manufacturing device 220, the weight of the vehicle 240 (FIG. 2) attached to the manufacturing device 220 (FIG. 2), the amount of vehicles on the assembly line 200 (FIG. 2), the structural integrity of the manufacturing device 220 (FIG. 2), and other relevant factors. A shown on in FIG. 7, the track assembly 330 of the over-travel system 300 may be designed to accommodate the over-travel distance 720 of the manufacturing device 220 (FIG. 2). For example, a length of the track assembly 330 may be longer than or equal to the over-travel distance 720 of the manufacturing device 220 (FIG. 2). In other examples, the track assembly 330 may be designed such that its length is adjustable to accommodate different over-travel distances. In certain examples, the arm assembly 350 may come to a hard stop at a distal end 338 of the track assembly 330. If the manufacturing device 220 continues to move beyond the over-travel distance 720 due to a malfunction of the controller, a miscalculated over-travel distance 720, or other unexpected event, for example, the arm assembly 350 may come to a hard stop at the distal end 338 of the track assembly 330. The hard stop may prevent the arm assembly 350 and the manufacturing device 220 from moving further in the direction of the movement 250 (FIG. 2).

Figure 8:
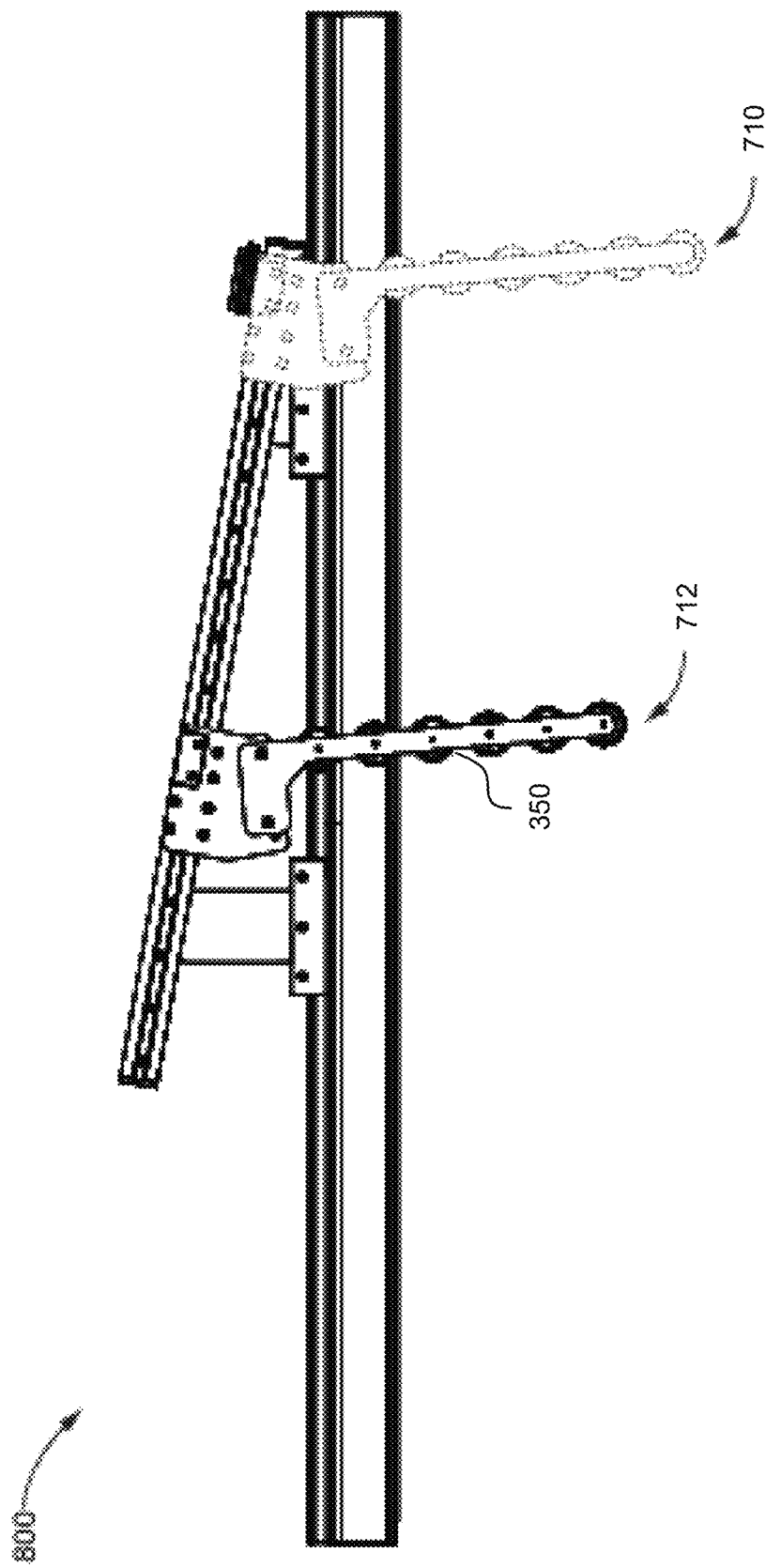
FIG. 8 illustrates an example of another operation of an example over-travel system, in accordance with aspects of the present disclosure.

Referring now to FIG. 8, another operation 800 of the over-travel system 300 of FIG. 7 is shown. As shown in FIG. 8, after removal of the external force, for example, the arm assembly 350 may return from the second position 712 back to the first position 710. In some example implementations, the arm assembly 350 may return to the first position 710 by relying exclusively on gravitational force. The angle between the track assembly 330 and the coupling assembly 310 may be configured so as to allow the arm assembly 350 to return to the first position 710 unassisted. In other examples, the arm assembly 350 may return to the first position 710 using a spring, a motor, or other biasing feature. After the arm assembly 350 returning to the first position 710, the detector 372 may detect the marker 374, indicating that the arm assembly 350 has restored to the first position 710. The restoration may cause the detector 372 to send a restoration signal to the controller of the assembly line 200 (FIG. 2) to indicate that the manufacturing device 220 no longer applies the external force to the arm assembly 350. Upon receiving the restoration signal, the controller may wait for an operator to manually restart the conveyor 230 and/or the manufacturing device 220, automatically restart the conveyor 230 and/or the manufacturing device 220, or notify the operator and prompt for an action.

By utilizing the one or more proximity sensors 370 and operably engaging the manufacturing device 220 with the arm assembly 350, the over-travel system 300 prevents the conveyor 230 and/or manufacturing device 220 from operating when the manufacturing device 220 applies the external force to the arm assembly 350 between the first position 710 and the second position 712. Further, the arm assembly 350 may return to the first position 710 unassisted when the manufacturing device 220 no longer applies the external force to the arm assembly 350.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. In some embodiments the controller for the assembly line may be implemented as a part of a computer system, or may include various aspects a computer system, such as the example computer system 900 shown in FIG. 9. The controller may be configured to receive a signal from the one or more proximity sensors 370 and transmit a control signal to the conveyor 230 and/or the manufacturing device 220 (FIG. 2) to suspend their operations.

Computer system 900 includes one or more processors, such as processor 904. The processor 904 is coupled to a communication infrastructure 906 (e.g., a communications bus, cross-over bar, or network). Various software aspects are described in terms of this example computer system. After reading this description, it will become apparent to a person skilled in the relevant art(s) how to implement aspects hereof using other computer systems and/or architectures.

Computer system 900 may include a display interface 902 that forwards graphics, text, and other data from the communication infrastructure 906 (or from a frame buffer not shown) for display on a display unit 930. Computer system 900 may include a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 may read from and/or write to a removable storage unit 918 in a well-known manner. Removable storage unit 918, represents a floppy disk, magnetic tape, optical disk, etc., which may be read by and written to removable storage drive 914. As will be appreciated, the removable storage unit 918 may include a computer usable storage medium having stored therein computer software and/or data.

Alternative aspects of the present disclosure may include secondary memory 910 and may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 may allow software and data to be transferred among computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 may be in the form of signals 928, which may be electronic, electromagnetic, optical or other signals capable of being received by communications interface 924. These signals 928 may be provided to communications interface 924 via a communications path (e.g., channel) 926. This path 926 may carry signals 928 and may be implemented using wire or cable, fiber optics, a telephone line, a cellular link, a radio frequency (RF) link, Wi-Fi link, Wi-Fi direct link, NFC, and/or other communications channels. As used herein, the terms "computer program medium" and "computer usable medium" refer generally to media such as a removable storage drive 914, a hard disk installed in hard disk drive 912, and/or signals 928. These computer program products may provide software to the computer system 900. Aspects of the present disclosure are directed to such computer program products.

Computer programs (also referred to as computer control logic) may be stored in main memory 908 and/or secondary memory 910. Computer programs may also be received via communications interface 924. Such computer programs, when executed, may enable the computer system 900 to perform the features in accordance with aspects of the present disclosure, as discussed herein. In particular, the computer programs, when executed, may enable the processor 910 to perform the features in accordance with aspects of the present disclosure. Accordingly, such computer programs may represent controllers of the computer system 900.

Where aspects of the present disclosure may be implemented using software, the software may be stored in a computer program product and loaded into computer system 900 using removable storage drive 914, hard drive 912, or communications interface 920. The control logic (software), when executed by the processor 904, may cause the processor 904 to perform the functions described herein. In another aspect of the present disclosure, the system may be implemented primarily in hardware using, for example, hardware components, such as application specific integrated circuits (ASICs) and/or microcontrollers. Implementation of the hardware state machine so as to perform the functions described herein will be apparent to persons skilled in the relevant art(s).

In yet another variation, aspects of the present disclosure may be implemented using a combination of both hardware and software.

Figure 10:
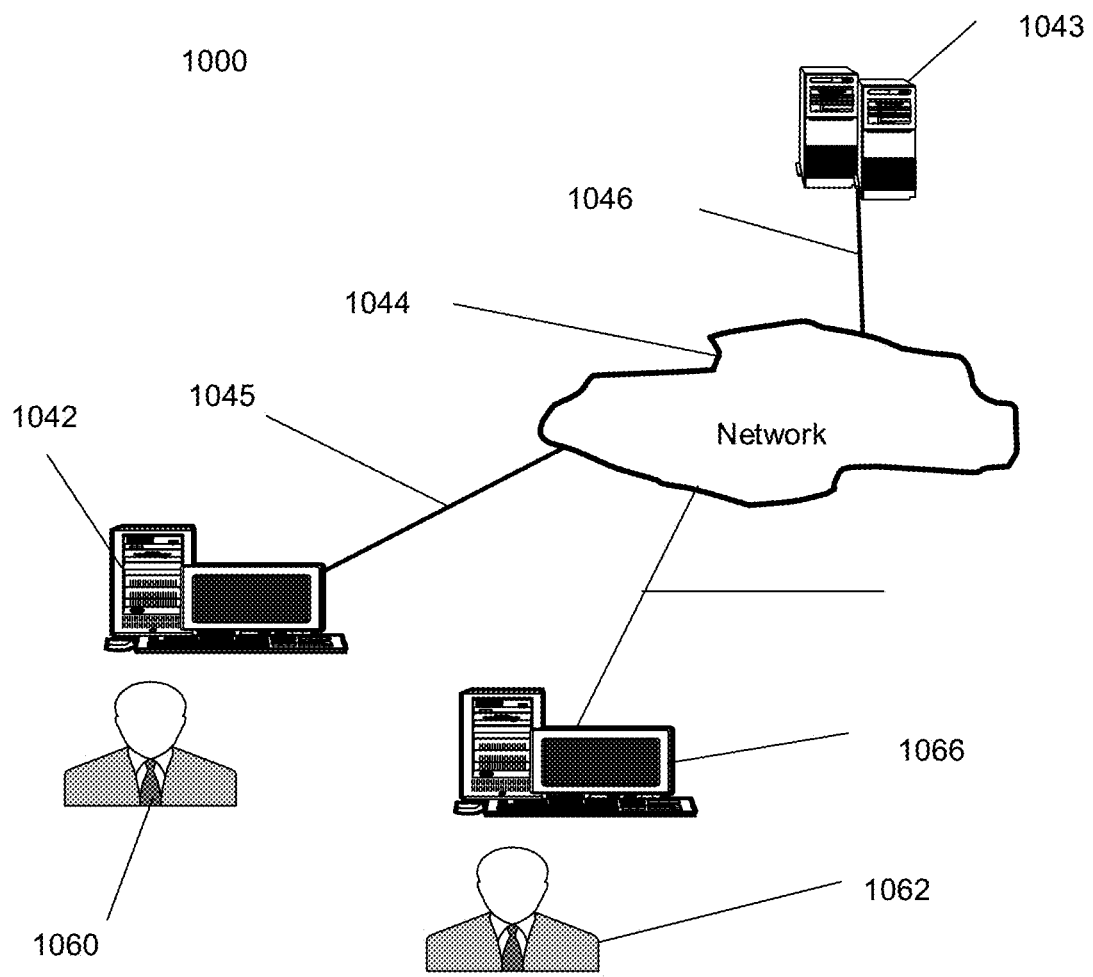
FIG. 10 shows an example communication system for use in accordance with an aspect of the present disclosure.

FIG. 10 shows a communication system 1000 usable in accordance with aspects of the present disclosure. The communication system 1000 includes one or more accessors 1060, 1062 (also referred to interchangeably herein as one or more "users") and one or more terminals 1042, 1066. In one aspect, data for use in accordance with the present disclosure is, for example, input and/or accessed by accessors 1060, 1062 via terminals 1042, 1066, such as personal computers (PCs), minicomputers, mainframe computers, microcomputers, telephonic devices, or wireless devices, such as personal digital assistants ("PDAs"), smart phones, or other handheld wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 10164. The couplings 1045, 1046, 1064 include, for example, wired, wireless, or fiberoptic links. In another variation, the method and system in accordance with aspects of the present disclosure operate in a stand-alone environment, such as on a single terminal.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:
1. An over-travel limiting system, comprising:
  a coupling assembly configured to couple to an overhead rail;

a track assembly including a track, wherein the track assembly is disposed at an angle with respect to the coupling assembly;

an arm assembly having an arm and a track guide mateably engageable with the track of the track assembly, the arm assembly being configured to move along the track between a first position and a second position; and one or more proximity sensors coupled to at least one of the track assembly and the arm assembly and configured to detect movement of the arm assembly with respect to the first position.

2. The over-travel system of claim 1, wherein the overhead rail is disposed along an assembly line for vehicles.

3. The over-travel system of claim 1, wherein the arm assembly is configured to move along the track under application of an external force.

4. The over-travel system of claim 3, wherein the arm assembly is configured to return from the second position to the first position after a removal of the external force.

5. The over-travel system of claim 4, wherein the arm assembly is configured to return from the second position to the first position based exclusively on an application of gravitational force.

6. The over-travel system of claim 1, wherein a length of the track assembly is longer than or equal to an over-travel distance of a manufacturing device in an assembly line for vehicles.

7. The over-travel system of claim 1, wherein each of the one or more proximity sensors is further configured to send a notification signal when detecting the movement of the arm assembly.

8. The over-travel system of claim 7, wherein the notification signal notifies a controller of a conveyor to suspend an operation of the conveyor.

9. The over-travel system of claim 1, wherein each of the one or more proximity sensors further includes a reed switch.

10. The over-travel system of claim 1, wherein a length of the track assembly may be adjustable.

11. An assembly line for manufacturing vehicles, comprising:

a manufacturing device;

a conveyor for moving the vehicles while being manufactured by a manufacturing device;

a controller configured to control an operation of the conveyor; and an over-travel limiting system configured to detect an unintended movement of the manufacturing device, the over-travel system including:

a coupling assembly configured to couple to a fixed component of the assembly line;

a track assembly including a track, wherein the track assembly is disposed at an angle with respect to the coupling assembly;

an arm assembly having an arm and a track guide mateably engageable with the track of the track assembly, the arm assembly being configured to move along the track between a first position and a second position relative to the track assembly; and one or more proximity sensors coupled to at least one of the track assembly and the arm assembly and configured to detect movement of the arm assembly with respect to the track assembly.

12. The assembly line of claim 11, wherein the arm assembly is configured to move along the track under application of an external force.

13. The assembly line of claim 12, wherein the arm assembly is configured to return from the second position to the first position after a removal of the external force.

14. The assembly line of claim 13, wherein the arm assembly is configured to return from the second position to the first position based exclusively on an application of gravitational force.

15. The assembly line of claim 11, wherein a length of the track assembly is longer than or equal to an over-travel distance of the manufacturing device.

16. The assembly line of claim 11, wherein the angle is between 10 degrees and 45 degrees.

17. The assembly line of claim 11, wherein the one or more proximity sensors is further configured to send a notification signal when detecting the movement of the arm assembly.

18. The assembly line of claim 17, wherein the notification signal notifies the controller to suspend the operation of the conveyor including the operation of the manufacturing device.

19. The assembly line of claim 11, wherein the one or more proximity sensors further includes a reed switch.

20. The assembly line of claim 11, wherein a length of the track assembly may be adjustable.

* * * * *